US012654304B2

(12) United States Patent

Herr

(10) Patent No.: US 12,654,304 B2

(45) Date of Patent: Jun. 16, 2026

(54) HANDHELD POWER TOOL

(71) Applicant: Robert Bosch GmbH, Stuttgart (DE)

(72) Inventor: Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/713,679

(22) PCT Filed: Nov. 9, 2022

(86) PCT No.: PCT/EP2022/081361

§ 371 (c)(1),
(2) Date: May 27, 2024

(87) PCT Pub. No.: WO2023/094166

PCT Pub. Date: Jun. 1, 2023

(65) Prior Publication Data

US 2025/0018545 A1    Jan. 16, 2025

(30) Foreign Application Priority Data

Nov. 29, 2021    (DE) ..................... 10 2021 213 442.4

(51) Int. Cl.
*B25F 5/00* (2006.01)
*H02K 7/14* (2006.01)
(52) U.S. Cl.
CPC .............. *B25F 5/008* (2013.01); *B25F 5/006* (2013.01); *H02K 7/145* (2013.01)
(58) Field of Classification Search
CPC ...... H02K 7/145; B25B 21/02; B25B 21/023; B25B 21/026; B25F 5/008; B25F 5/006; B25F 5/00
See application file for complete search history.

(56) References Cited

U.S. PATENT DOCUMENTS 9,048,699 B2 *  6/2015  Oomori .................. H05K 1/181
9,731,410 B2    8/2017  Hirabayashi et al.
(Continued)

FOREIGN PATENT DOCUMENTS

DE    10 2019 213 785 A1    3/2021
DE    10 2020 210 674 A1    3/2021
(Continued)

OTHER PUBLICATIONS

International Search Report corresponding to PCT Application No. PCT/EP2022/081361, mailed Feb. 17, 2023 (German and English language document) (7 pages).

*Primary Examiner* — Joshua G Kotis

(74) *Attorney, Agent, or Firm* — Maginot, Moore & Beck LLP

(57) ABSTRACT

A hand-held power tool includes a housing, a tool holder for holding an insert tool, an electrically commutated drive motor that is arranged in the housing and has a drive shaft mounted by at least one bearing, a fan impeller, and a sensor board for sensor-controlled commutation of the electrically commutated drive motor, the sensor board being arranged in the housing between the drive motor and the fan impeller. The power tool further includes at least one mounting element designed to arrange the sensor board in the housing in a manner mechanically decoupled from the electrically commutated drive motor. The sensor board and the fan impeller are arranged at an end of the electrically commutated drive motor facing away from the tool holder.

15 Claims, 10 Drawing Sheets

(56) References Cited

U.S. PATENT DOCUMENTS

| | | | | |
|---|---|---|---|---|
| 11,738,441 B2 * | 8/2023 | Kusumoto | ............ | H02K 5/225 173/217 |
| 2006/0213333 A1 * | 9/2006 | Kageler | ................. | H01H 9/06 81/436 |
| 2006/0255756 A1 * | 11/2006 | Iwata | ....................... | H02K 9/06 318/400.41 |
| 2009/0261693 A1 * | 10/2009 | Debraillly | ............ | F16C 35/067 310/68 B |
| 2010/0277014 A1 * | 11/2010 | Hicks | ................... | H02K 11/026 333/172 |
| 2010/0283332 A1 * | 11/2010 | Toukairin | ............... | H02K 11/33 310/50 |
| 2011/0073334 A1 * | 3/2011 | Limura | ................... | B25B 21/02 173/217 |
| 2011/0180286 A1 * | 7/2011 | Oomori | ................... | H02K 9/06 173/217 |
| 2011/0188232 A1 * | 8/2011 | Friedman | ................. | F21S 9/04 362/119 |
| 2011/0203822 A1 * | 8/2011 | Harada | ................... | B25B 21/02 173/20 |
| 2014/0265664 A1 * | 9/2014 | Camilleri | ................. | H02K 9/06 310/59 |
| 2015/0097641 A1 * | 4/2015 | Chen | ........................ | B25F 5/02 335/126 |
| 2015/0364973 A1 * | 12/2015 | Tadokoro | ................. | H02K 9/02 310/50 |
| 2016/0149474 A1 | 5/2016 | Smith et al. | | |
| 2016/0199972 A1 * | 7/2016 | Kishima | ................... | B25F 5/02 173/217 |
| 2016/0229045 A1 * | 8/2016 | Hashimoto | .......... | B25D 17/043 |
| 2018/0241281 A1 | 8/2018 | Doan et al. | | |
| 2019/0273421 A1 * | 9/2019 | Velderman | ........... | H02K 11/215 |
| 2020/0052559 A1 * | 2/2020 | Matsushita | ............ | H02K 21/16 |
| 2021/0060754 A1 * | 3/2021 | Tadokoro | ................. | B25F 5/02 |
| 2021/0091639 A1 * | 3/2021 | Purohit | ...................... | B25F 5/02 |
| 2021/0194319 A1 * | 6/2021 | Smith | .................... | H02K 29/08 |
| 2021/0268644 A1 * | 9/2021 | Takagi | ........................ | B25J 9/06 |
| 2022/0184792 A1 * | 6/2022 | Nakatsuka | ................ | B25F 5/00 |
| 2022/0337122 A1 * | 10/2022 | Herr | ..................... | H02K 11/215 |
| 2022/0393550 A1 * | 12/2022 | Fujii | ...................... | H02K 21/02 |

FOREIGN PATENT DOCUMENTS

| | | |
|---|---|---|
| EP | 2 954 984 A1 | 12/2015 |
| JP | 2016-175163 A | 10/2016 |
| JP | 2017-213661 A | 12/2017 |
| WO | 2021/048025 A1 | 3/2021 |

* cited by examiner

HANDHELD POWER TOOL

This application is a 35 U.S.C. § 371 National Stage Application of PCT/EP2022/081361, filed on Nov. 9, 2022, which claims the benefit of priority to Serial No. DE 10 2021 213 442.4, filed on Nov. 29, 2021 in Germany, the disclosures of which are incorporated herein by reference in their entirety.

The present disclosure relates to a hand-held power tool.

BACKGROUND

A hand-held power tool with a drive unit, having a housing and having at least one user interface is already known from the prior art. The drive unit can be actuated by means of at least one manual switch. The user interface comprises at least one control element.

SUMMARY

The present disclosure is based on a hand-held power tool having a housing, having a tool holder for holding an insert tool, having an electrically commutated drive motor, wherein the drive motor is arranged in the housing and the drive motor has a drive shaft mounted by means of at least one bearing, having a fan impeller, having a sensor board for sensor-controlled commutation of the electrically commutated drive motor, wherein the sensor board is arranged in the housing between the drive motor and the fan impeller, having at least one mounting element, wherein the mounting element is designed to arrange the sensor board in the housing in a manner mechanically decoupled from the electrically commutated drive motor. The disclosure proposes that the sensor board and the fan impeller are arranged at an end of the electrically commutated drive motor facing away from the tool holder.

The disclosure provides a compact hand-held power tool in which a compact design is made possible. This is achieved by arranging the sensor board and the fan impeller at the end of the drive motor facing away from the tool holder.

The hand-held power tool is designed as an electrically operated hand-held power tool. In this case, the electrically operated hand-held power tool can be designed as a mains-operated or battery-powered hand-held power tool. For example, the hand-held power tool can be designed as a screwdriver, a drill screwdriver, a rotary impact screwdriver, a hammer, a drill hammer or an impact drill screwdriver.

The housing of the hand-held power tool is designed to at least partially accommodate the tool holder, the drive motor, the fan impeller, the sensor board and the mounting element. The housing can be designed as a shell housing with two half shells. The housing can have at least one air inlet opening and at least one air outlet opening. The air inlet opening is designed to introduce air into the housing. The air outlet opening is designed to discharge heated air from the housing. The air outlet opening can be disposed on the fan impeller.

The tool holder can be designed as an internal tool holder, for example a bit holder, and/or as an external tool holder, for example a socket holder. It is also conceivable that the tool holder be designed as a drill chuck. The tool holder can accommodate insert tools, such as screw bits or socket wrenches, so that a user can produce screw connections from a fastening element to a fastening carrier.

The hand-held power tool has a drive unit. The drive unit comprises the electrically commutated drive motor and, in one embodiment, can have at least one transmission. In particular, the drive motor can be designed as at least one electric motor. The transmission can be configured as at least one planetary gear, wherein it can, for example, be shiftable. In a shiftable transmission, it is possible to switch between at least two gear stages by means of at least one gear shifting element, in particular a gear shifter. The drive motor is designed such that it can be actuated via a manual switch. When the manual switch is actuated by a user, the drive motor is switched on and the hand-held power tool is put into operation. If the manual switch is not further actuated by the user, the drive motor is switched off. The drive motor can preferably be electronically controlled and/or regulated such that a reversing mode and a specification for a desired rotational speed can be implemented. In reversing mode, the drive motor can be switched between a clockwise direction of rotation and a counterclockwise direction of rotation. To switch the drive motor in reversing mode, the hand-held power tool can comprise a rotation direction switching element, in particular a rotation direction changeover switch.

The hand-held power tool can comprise a percussion mechanism. The percussion mechanism generates high torque peaks during operation to loosen tight connecting means or to fasten connecting means. The percussion mechanism can be connected to the drive motor by way of the transmission. The percussion mechanism can, e.g., be designed as a rotary percussion mechanism, a detent percussion mechanism, a rotary percussion mechanism, or a hammer percussion mechanism. The air inlet opening can be located at the percussion mechanism and/or the transmission. The transmission and/or the percussion mechanism can have an intermediate shaft. For example, the intermediate shaft can accommodate planetary gears of the transmission. Furthermore, the intermediate shaft can at least partially actuate the percussion mechanism.

The drive motor comprises the drive shaft. The drive shaft is mounted in the housing by means of at least one bearing. The drive motor can actuate the transmission, the percussion mechanism and/or the tool holder by means of the drive shaft. The bearing can be designed as a ball bearing, a rolling bearing or a plain bearing, for example. The bearing is arranged at the end of the drive motor facing away from the tool holder. The drive shaft can project into the intermediate shaft. A further bearing can also be provided to support the drive shaft. The additional bearing can be arranged in the intermediate shaft so that the drive shaft is mounted in the intermediate shaft by means of the additional bearing. The additional bearing can, for example, be designed as a ball bearing, a rolling bearing or a plain bearing. The hand-held power tool can have a hand-held power tool axis. In this case, an axis of rotation of the drive shaft can form the hand-held power tool axis. In particular, "axial" should be understood as essentially parallel to the hand-held power tool axis. Whereas "radial" is to be understood as essentially perpendicular to the hand tool axis.

The hand-held power tool has the fan impeller. The fan impeller can be arranged on the drive shaft. In this case, the fan impeller and the drive shaft can form an interlocking, non-positive and/or substance-to-substance bond. The fan impeller can have a connecting body and an air control body. The connecting body can be designed to connect the air control body to the drive shaft. It is conceivable that the connecting body forms a non-positive connection with the drive shaft. In this case, it is possible for the connecting body to create a press-fit on the drive shaft. The connecting body can, for example, rest against the bearing. The air control body is designed to guide air inside the housing. In this way, the air control body can guide air from the air inlet opening to the air outlet opening. The air control body can have air control fins. The air control body, in particular the air control fins, can be directed towards the sensor board and/or the drive motor.

In addition, the hand-held power tool comprises a power supply, wherein the power supply is provided for battery operation by means of rechargeable batteries, in particular hand-held power tool rechargeable battery pack, and/or for mains operation. In a preferred embodiment, the power supply is designed for battery operation. In the context of the present disclosure, the expression "hand-held power tool rechargeable battery pack" is understood to mean a combination of at least one rechargeable battery cell and a rechargeable battery pack housing. The hand-held power tool rechargeable battery pack is advantageously designed to supply power to commercially available battery-powered hand-held power tools. The at least one rechargeable battery cell can, for instance, be designed as a Li-ion rechargeable battery cell having a nominal voltage of 3.6 V. The hand-held power tool rechargeable battery pack can, e.g., comprise up to ten rechargeable battery cells, wherein a different number of rechargeable battery cells also is conceivable. Both an embodiment as a battery-powered hand-held power tool and operation as a mains-operated hand-held power tool are sufficiently well-known to the skilled person, so the specifics of the power supply will not be addressed herein.

The hand-held power tool can have a control unit at least for controlling the drive unit. The control unit can be arranged in the housing, for example in a handle of the hand-held power tool or in an area of a power supply interface. The sensor board can be connected to the control unit for sensor-controlled commutation of the drive motor. The sensor board and the control unit can, for example, be connected to each other by cable. For example, the sensor board and the control unit can be connected to each other by means of at least one connector and one coupling. The sensor board is arranged in the housing between the drive motor and the fan impeller on the end of the drive motor facing away from the tool holder. The sensor board can have at least one sensor element, such as a Hall sensor. For example, three sensor elements can be provided on the sensor board. It is also conceivable that the sensor board has at least one further sensor element. The additional sensor element can be a temperature sensor and/or an acceleration sensor, for example. The control unit is designed to control and/or regulate the drive motor depending on signals from the sensor board. The control unit can receive the signals from the sensor board and switching signals from the manual switch. It is conceivable that the control unit processes the switching signals from the manual switch before the control unit forwards the switching signals to the drive unit for control. The control unit is designed to process the signals from the sensor board and the switching signals such that the drive unit, in particular the drive motor, can be controlled and/or regulated as required. The control unit can comprise at least one microprocessor or a microcontroller.

The hand-held power tool has at least one mounting element. The mounting element is designed to arrange the sensor board in the housing so that it is mechanically decoupled from the drive motor. In this case, the mounting element enables the sensor board to be arranged inside the housing decoupled from the drive motor. In this case, the sensor board essentially has no mechanical connection to the drive motor, but is arranged in the housing via the mounting element. Typically, the sensor board is attached to the drive motor using screws. The mounting element allows the sensor board to be arranged on the drive motor, but essentially has no mechanical connection to the drive motor. By "essentially no mechanical connection" it should be understood that the sensor board is neither screwed, glued or latched directly to the drive motor nor is it connected directly to the drive motor via a holding device, such as by means of a snap-fit connection, a screw connection or a snap-in mechanism or the like. However, it is conceivable that the sensor board and the drive motor can form an electrical connection, for example by means of at least one cable, a wire or an electrical plug-in connection. In this case, the electrical connection between the sensor board and the drive motor is only designed to enable the transfer of electrical signals between the sensor board and the drive motor. In the electrical connection, it is conceivable that the drive motor has an NTC resistor or an NTC thermistor for measuring the temperature of the drive motor and that a connecting cable of the NTC resistor or the NTC thermistor can be routed from the drive motor to the sensor board. This allows a temperature signal to be transmitted from the drive motor to the sensor board via the connecting cable.

The mounting element can be connected to the housing in a form-locking, force-locking and/or substance-to-substance-locking manner. It is conceivable that the housing forms the mounting element, so that the housing and the mounting element are in one piece. The mounting element can be arranged on the bearing. It is also conceivable that the mounting element is arranged in the area of the handle of the housing. It is possible that one half-shell of the housing has a mounting element in each case. The mounting element can, for example, be designed in the form of a bridge or a web.

In one embodiment of the hand-held power tool, the mounting element is designed to arrange the sensor board between the drive motor and the fan impeller. The mounting element thereby arranges the sensor board between the drive motor and the fan impeller at the end of the drive motor facing away from the tool holder. It is conceivable that a stator of the drive motor at least partially overlaps the sensor board in the axial direction of the hand-held power tool axis. It is also conceivable that motor terminals of the stator overlap the sensor board in the axial direction so that the motor terminals at least partially encompass the sensor board. In this case, it is conceivable that at least part of the sensor board is arranged between a rotor of the drive motor and the stator in the radial direction of the drive shaft. These arrangements are made possible by the arrangement of the sensor board by means of the mounting element.

In one embodiment of the hand-held power tool, the at least one bearing is arranged between the drive motor and the fan impeller. The bearing is thereby arranged between the drive motor and the fan impeller such that the air can flow from the air inlet opening via the fan impeller to the air outlet opening with essentially low turbulence. The connecting body of the fan impeller can rest against the bearing, in particular against an inner ring of the bearing. The bearing, in particular the inner ring of the bearing, can rest against the drive motor, in particular against a spacer of the drive motor or against the rotor of the drive motor, in particular the rotor magnets. It is conceivable that the stator of the drive motor overlaps the bearing in the axial direction of the drive shaft. It is also conceivable that the motor terminals of the stator protrude at least partially over the bearing.

In one embodiment, the mounting element is designed to arrange the sensor board between the at least one bearing and the drive motor. The mounting element can thereby arrange the sensor board with an axial offset so that the sensor board is arranged between the bearing and the drive motor. It is conceivable that an outer diameter of the bearing is larger than an opening of the sensor board for the drive shaft.

In one embodiment of the hand-held power tool, the sensor board is designed such that the sensor board encompasses the drive shaft at least in sections. For example, the sensor board can be designed in the shape of a crescent, sickle, C-shaped, T-shaped or J-shaped. In this case, the sensor board can encompass the drive shaft in an angular range of 10° to 330°. It is conceivable that the sensor board encompasses the drive shaft essentially completely.

In one embodiment, the sensor board is designed such that the sensor board encompasses the at least one bearing at least in sections. The sensor board can encompass the bearing in an angular range of 10° to 350°, in particular in an angular range of 150° to 190°.

In one embodiment of the hand-held power tool, the sensor board has at least one receptacle element, wherein the receptacle element is designed to accommodate the at least one bearing. The receptacle element can form an interlocking, non-positive and/or substance-to-substance bond with the bearing. The receptacle element can, for example, be designed in the form of an arcuate cut-out or recess in the sensor board.

In one embodiment of the hand-held power tool, the receptacle element is designed such that the sensor board is supported on the at least one bearing by means of the receptacle element. In addition, the sensor board can rest against the bearing by means of the receptacle element. The bearing has an outer ring. The sensor board, in particular the receptacle element, can rest against the outer ring of the bearing. The sensor board, in particular the receptacle element, can be positioned and/or aligned relative to the drive shaft by means of the outer ring. In addition, forces acting on the sensor board can be transferred to the housing by means of the receptacle element and the bearing.

In one embodiment of the hand-held power tool, the receptacle element is arranged in the housing at a distance from the at least one bearing and/or the drive shaft. In this case, the receptacle element can be at a distance from the bearing and/or the drive shaft. This makes it possible to reduce, in particular minimize, the transmission of vibrations to the sensor board.

In one embodiment of the hand-held power tool, the mounting element has at least one mounting receptacle, wherein the mounting receptacle is designed to accommodate the at least one bearing. The mounting receptacle can form a form-locking, force-locking and/or substance-to-substance-locking bond with the bearing. It is also conceivable that the mounting element forms the mounting receptacle so that the mounting element and the mounting receptacle are in one piece. The mounting receptacle can, for example, be shaped like a shell, a half-shell, a pot or a cup. If two mounting elements are provided for the two half-shells of the housing, each mounting element can have a mounting receptacle.

In one embodiment of the hand-held power tool, the mounting receptacle encompasses, in particular encloses, the at least one bearing at least partially, in particular in a peripheral direction. In this case, the mounting receptacle can encompass the bearing in the peripheral direction with respect to the hand-held power tool axis. The mounting receptacle is designed to secure the bearing in an axial and radial direction relative to the hand-held power tool axis.

In one embodiment of the hand-held power tool, the mounting element has at least one sensor board receptacle, wherein the sensor board receptacle is designed to accommodate the sensor board. The sensor board receptacle is designed to secure the sensor board axially and radially. In this case, the sensor board receptacle is designed to accommodate the sensor board at least in an interlocking manner. It is conceivable that the sensor board receptacle holds the sensor board in a force-locking manner or is connected to the sensor board in a substance-to-substance-locking manner. The sensor board receptacle and the sensor board can, for example, be connected to each other in the form of a snap-fit connection or a plug-in connection. It is also conceivable that the sensor board is screwed to the sensor board receptacle. The sensor board receptacle can be designed in the form of a groove, a shaft, a tray, a drawer, a pocket or a pot, for example. It is also possible for the sensor board and/or the sensor board receptacle to have at least one strain relief hole for at least one sensor cable. The sensor cable enables an electrical connection from the sensor board to the control unit.

In an alternative embodiment, the mounting element is designed in the form of a connecting coupling. In this case, the connecting coupling has the sensor board receptacle and a plug-in element. The sensor board receptacle is arranged at a first free end of the connecting coupling and is designed here as a shaft-like receptacle for the sensor board. The shaft-like receptacle is designed to accommodate and enclose the sensor board at least partially and at least in sections. The sensor board can thereby be inserted into the shaft-like receptacle. It is also conceivable that the sensor board receptacle is at least partially encapsulated around the sensor board. The plug-in element is arranged at a second free end of the connecting coupling. The plug-in element is designed to establish a mechanical connection with at least the housing, in particular one of the half shells of the housing. The housing, in particular one of the half-shells of the housing, can have a socket for the plug-in element. The socket is designed to accommodate the plug-in element and to establish a mechanical connection by means of the plug-in element. The plug-in element and the socket are designed such that the plug-in element can be inserted into the socket. The socket can form a positive and/or non-positive connection with the plug-in element. In addition, the socket can form a snap, hook, snap-in or bayonet connection with the plug-in element. This allows the sensor board to have essentially no direct connection with the housing, in particular one of the half shells of the housing, but to be connected to the housing indirectly by means of the connecting coupling.

In one embodiment of the hand-held power tool, the mounting element has at least one support element, wherein the support element is designed to support the sensor board against the housing. The mounting element and the support element can be connected to each other in a form-locking, force-locking and/or substance-to-substance locking manner. It is also conceivable that the mounting element forms the support element so that the mounting element and the support element are in one piece. The support element can be designed in the form of a coupling, a web or an L-shaped bracket, for example. It is possible for the sensor board to have at least one pin. In this case, the support element can hold the pin in place with at least a form-locking fit. The support element enables forces that occur, for example due to operation of the hand-held power tool or due to a fall onto a floor, to be diverted into the housing.

In one embodiment, the mounting element forms the mounting receptacle, the sensor board receptacle and the support element. This means that the mounting element, the mounting receptacle, the sensor board receptacle and the support element can be formed in one piece.

In one embodiment, the hand-held power tool has a further mounting element for mounting the sensor board, wherein the further mounting element is arranged in the housing between the drive motor and the fan impeller. The further mounting element can be connected to the housing in a form-locking, force-locking and/or substance-to-substance-locking manner. It is also possible for the housing to form the further mounting element so that the further mounting element and the housing are in one piece. It is possible that each half shell of the housing has a further mounting element. The further mounting element can, for example, be shaped like a groove, a shell, a pot or U-shaped. The further mounting element can be arranged in the area of the handle. In particular, the additional mounting element is arranged on the handle. The additional mounting element enables greater stability of the sensor board during drop tests.

In the event that the sensor board and/or the mounting receptacle rests against the bearing, the additional mounting element can be designed in the form of a coupling. In this case, the sensor board can then have a type of connector or pin that creates at least one interlocking connection with the coupling.

In the event that the sensor board is arranged at a distance from the bearing, the sensor board can, for example, have two webs or be designed in the form of an L-shaped angle in order to support the sensor board.

In an alternative embodiment, the further mounting element forms the mounting receptacle, the sensor board receptacle and the support element. It is therefore conceivable that the further mounting element, the mounting receptacle, the sensor board receptacle and the support element are in one piece.

In one embodiment, the sensor board is arranged between the drive motor and the fan impeller such that an air flow from the drive motor to the fan impeller can be directed around the sensor board with essentially low turbulence, in particular without turbulence. This allows the air flow entering the housing through the air inlet opening to flow over a percussion mechanism housing, a transmission housing or a percussion mechanism cover with essentially low turbulence. In this case, any heat that can be generated by the operation of the hand-held power tool can be absorbed by the air flow. The air flow can then flow around the drive motor and thereby absorb further heat. The sensor board is now arranged between the drive motor and the fan impeller such that the air flow can be directed around the sensor board with essentially low turbulence, in particular without turbulence, so that the absorbed heat can be directed towards the fan impeller. Hereby the heat can be efficiently transported via the fan impeller to the air outlet opening and the heat escape from the housing.

In one embodiment of the hand-held power tool, the housing has at least one flow-through element, wherein the flow-through element is arranged between the drive motor and the fan impeller. The housing and the flow-through element can be connected to each other in a form-locking, force-locking and/or substance-to-substance-locking manner. It is also conceivable that the housing forms the flow-through element. The flow-through element can, for example, be designed as a flow-through opening or a flow-through cut-out. Two flow-through openings are provided here as an example. The flow-through openings can, for example, be designed as a circular segment, circular, elliptical, triangular, square or polygonal. The flow-through element can be arranged between the sensor board and the fan impeller.

In one embodiment of the hand-held power tool, the sensor board has at least one air control element, which is designed to guide an air flow from the drive motor to the fan impeller. For example, the sensor board can form the air control element. The air control element can, for example, be designed as an opening or an exception, wherein a circular, elliptical or arcuate cut-out shape is conceivable. The air control element is designed so that the air flow can be directed from the drive motor to the fan impeller with essentially low turbulence.

In one embodiment of the hand-held power tool, the mounting element and/or the further mounting element has at least one air control element, wherein the air control element is designed to guide an air flow from the drive motor to the fan impeller. In this case, the mounting element and/or the further mounting element can form the air control element. The air control element can, for example, be designed as an opening, a recess, an edge, a projection or a web. The air control element enables the air flow to be guided from the drive motor to the fan impeller with essentially low turbulence, in particular without turbulence.

BRIEF DESCRIPTION OF THE DRAWINGS

The disclosure is explained in more detail in the following with reference to preferred embodiments. The drawings hereinafter show.

DETAILED DESCRIPTION

Figure 1:
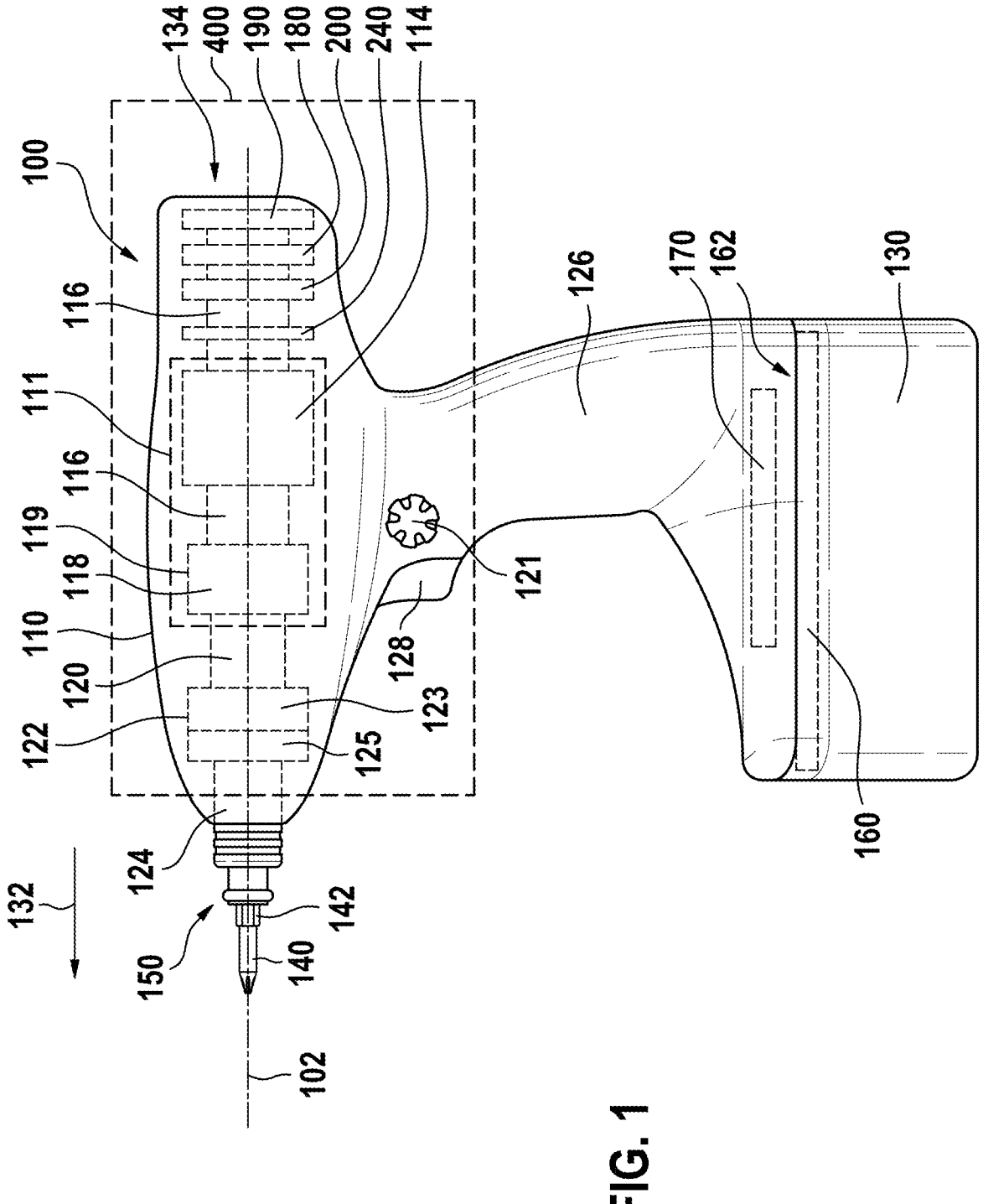
FIG. 1 a schematic view of a hand-held power tool according to the disclosure.

FIG. 1 shows a hand-held power tool 100 according to the disclosure, wherein it is designed here for example as a cordless rotary impact screwdriver. The hand-held power tool 100 comprises a pinion shaft 124, a tool holder 150, and an exemplary percussion mechanism 122, such as a rotary or rotational percussion mechanism. The hand-held power tool 100 comprises a housing 110 with a handle 126. The hand-held power tool 100 can be mechanically and electrically connected to a mains-independent power supply with a power supply for battery operation, so that the hand-held power tool 100 is designed as a battery-powered hand-held power tool 100. A hand-held power tool rechargeable battery pack 130 is in this case used as the power supply. However, the present disclosure is not limited to battery-powered hand-held power tools, but can also be applied to mains-dependent, i.e. mains-operated, hand-held power tools.

The housing 110 thereby comprises a drive unit 111 and the percussion mechanism 122, wherein the drive unit 111 and the percussion mechanism 122 are arranged in the housing 110. The drive unit 111 comprises an electrically commutated drive motor 114, which is supplied with power by the hand-held power tool rechargeable battery pack 130, and a transmission 118. The drive motor 114 comprises a stator 165, an end plate 166, a rotor 167 and rotor magnets 168; see also FIG. 2. The transmission 118 is designed as at least one planetary gear, see also FIG. 2. The drive motor 114 is designed such that it can be actuated, e.g. via a manual switch 128, so that the drive motor 114 can be switched on and off. The drive motor 114 can advantageously be electronically controlled and/or regulated so that a reversing mode and a desired rotational speed can be implemented. For the reversing mode, the hand-held power tool 100 comprises a rotation direction switching element 121 designed as a rotation direction changeover switch. The rotation direction switching element 121 is designed to switch the drive motor 114 between a clockwise direction of rotation and a counterclockwise direction of rotation. The design and mode of operation of a suitable drive motor are well known to the skilled person, for which reason they will not be described in greater detail herein.

The transmission 118 is connected to the drive motor 114 via a drive shaft 116. The drive shaft 116 is mounted in the housing 110 by means of a bearing 180. The transmission 118 is intended to convert a rotation of the drive shaft 116 into a rotation between the transmission 118 and the percussion mechanism 122 via an intermediate shaft 120. Preferably, this conversion takes place such that the intermediate shaft 120 rotates relative to the drive shaft 116 with increased torque, but at a reduced rotational speed. The intermediate shaft 120 here accommodates planetary wheels 129 of the transmission 118, wherein only one planet wheel 129 is shown, see also FIG. 2. The intermediate shaft 120 drives the percussion mechanism 122 at least partially. The transmission 118 comprises a transmission housing 119, which is arranged in the housing 110. Further, the hand-held power tool 100 comprises a fan impeller 190. The fan impeller 190 is intended to generate an air flow in the housing 110. The hand-held power tool 100 comprises a hand-held power tool axis 102, wherein an axis of rotation of the drive shaft 116 forms the hand-held power tool axis 102.

The percussion mechanism 122 is connected to the intermediate shaft 120 and comprises a percussion body 125, which generates percussive rotary pulses with high intensity. These impact-like rotary pulses are transmitted to the pinion shaft 124, for example a work spindle, via the percussion body 125. The percussion mechanism 122 comprises a percussion mechanism housing 123, wherein the percussion mechanism 122 can also be arranged in another suitable housing, such as the transmission housing 119. The percussion mechanism 122 is designed to drive the pinion shaft 124. A tool holder 150 is provided on the pinion shaft 124. The tool holder 150 is preferably integrally formed with and/or designed on the pinion shaft 124. The tool holder 150 is preferably arranged in an axial direction 132 facing away from the drive unit 111. The tool holder 150 is designed here as a hexagon socket, in the form of a bit holder, which is provided to hold an insertion tool 140. The insertion tool is designed in the form of a screwdriver bit having a polygonal outer coupling 142. The type of the screwdriver bit, e.g. a HEX type, is sufficiently well-known to the skilled person.

The present disclosure is not limited to the use of HEX screwdriver bits, however; other tool holders that appear useful to the persons skilled in the art, such as HEX drills, SDS quick-insert tools, or round-shank drill chucks, can be used as well. In addition, the design and function of a suitable bit holder are well known to the person skilled in the art.

The hand-held power tool 100 has a control unit 170 at least for controlling the drive unit 111, in particular the drive motor 114, and a sensor board 240 for sensor-controlled commutation of the electrically commutated drive motor. The sensor board 240 is disposed in the housing 110 between the drive motor 114 and the fan impeller 190. The housing 110 at least partially accommodates the control unit 170. The sensor board 240 is connected to the control unit 170 by means of a sensor cable 242 for sensor-controlled commutation of the drive motor 114. The sensor board 240 and the control unit 170 are connected to each other by means of a connector 244 and a coupling; see also FIGS. 2, 3, 4. It is also conceivable that the sensor board 240 and the control unit 170 are connected to each other by means of a connecting cable and that the connecting cable is soldered to the sensor board 240 and the control unit 170 respectively. The control unit 170 comprises a microprocessor not shown in detail. In addition, the housing 110 comprises a power supply holding device 160. The power supply holding device 160 accommodates the hand-held power tool rechargeable battery pack 130 and thereby forms a base 162 comprising a standing surface. The hand-held power tool rechargeable battery pack 130 can be released from the power supply holding device 160 without tools. The housing 110 also comprises the handle 126 and the power supply holding device 160. The handle 126 can be grasped by the user. In one embodiment, the power supply holding device 160 is arranged on the handle 126. The hand-held power tool 100 can be set down on the base 162.

The hand-held power tool 100 comprises a mounting element 200. The mounting element 200 is intended to arrange the sensor board 240 in the housing 110 mechanically decoupled from the electrically commutated drive motor 114. In this case, the sensor board 240 and the fan impeller 190 are arranged at an end 134 of the electrically commutated drive motor 114 that faces away from the tool holder 150.

Figure 2:
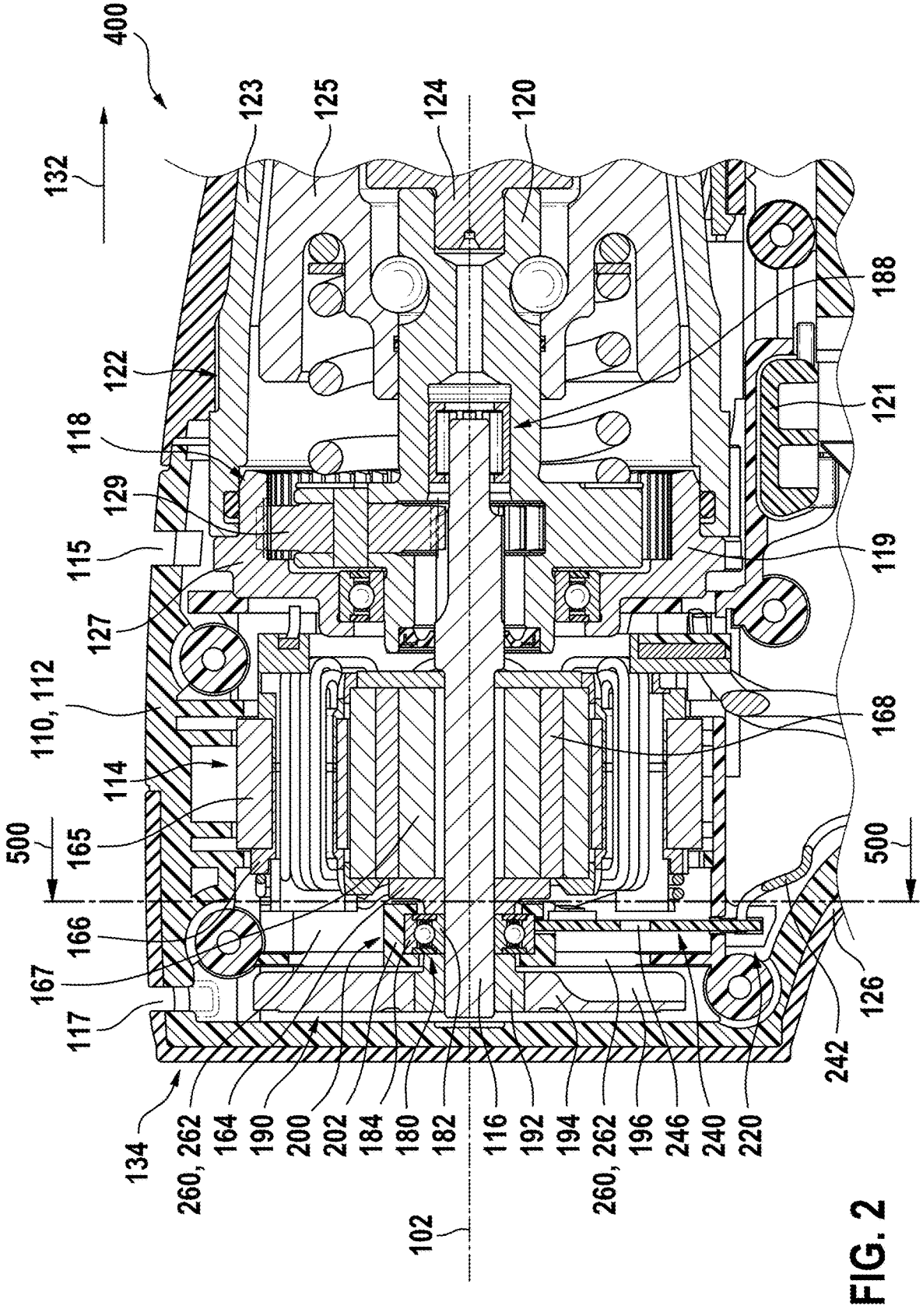
FIG. 2 a section of a longitudinal cross-section of the hand-held power tool.

FIG. 2 shows a section 400 of a longitudinal section of the hand-held power tool 100. The housing 110 at least partially accommodates the tool holder 150, the drive motor 114, the fan impeller 190, the sensor board 240 and the mounting element 200. Here, the housing 110 is formed as a shell housing with two half-shells 112, wherein only one half-shell 112 is shown. By way of example, the housing 110 here comprises an air inlet opening 115 and an air outlet opening 117. In this case, the air inlet opening 115 is intended to introduce air into the housing 110 and the air outlet opening 117 is intended to discharge heated air from the housing 110. The air inlet opening 115 is arranged at the percussion mechanism 122 and at the transmission 118. The air outlet opening 117 is arranged at the fan impeller 190.

The drive shaft 114 is mounted in the housing 110 by means of the bearing 180. In this case, the drive motor 114 actuates the transmission 118, the percussion mechanism 122 and the tool holder 150 by means of the drive shaft 116. The bearing 180 is exemplarily shaped as a ball bearing. Furthermore, the bearing 180 is arranged at the end 134 of the drive motor 114 facing away from the tool holder 150. Here, the drive shaft 116 protrudes into the intermediate shaft 120, for example. In this case, the hand-held power tool 100 comprises a further bearing 188 for mounting the drive shaft 116. In addition, the further bearing 188 is arranged here, by way of example, in the intermediate shaft 120, wherein the drive shaft 116 is mounted in the intermediate shaft 120 by means of the further bearing 188. Here, the further bearing 188 is exemplarily formed as a rolling bearing.

The mounting element 200 arranges the sensor board 240 in the housing 110 mechanically decoupled from the drive motor 114. Here, the housing 110 forms the mounting element 200 so that the housing 110 and the mounting element 200 are in one piece, see also FIG. 3. In each case, a half-shell 112 of the housing 100 comprises a mounting element 200, see also FIG. 3. In this case, the mounting element 200 is formed in the manner of a web. The mounting element 200 is arranged on the bearing 180. Further, the mounting element 200 arranges the sensor board 240 between the drive motor 114 and the fan impeller 190 at the end 134 of the drive motor 114 facing away from the tool holder 150. The bearing 180 is arranged between the drive motor 114 and the fan impeller 190, wherein the air flow can flow from the air inlet opening 115 via the fan impeller 190 to the air outlet opening 117 with substantially low turbulence. Further, the mounting element 200 arranges the sensor board 240 between the bearing 180 and the drive motor 114.

The hand-held power tool 100 comprises a further mounting element 220 for mounting the sensor board 240. The further mounting element 220 is arranged in the housing 110 between the drive motor 114 and the fan impeller 190. Here, the housing 110 forms the further mounting element 220, thereby here the further mounting element 220 and the housing 110 are integral. Furthermore, here each half-shell 112 of the housing 110 comprises a further mounting element 220, see also FIG. 3. By way of example, the further mounting element 220 is U-shaped and arranged in the region of the handle 126.

The fan impeller 190 is arranged on the drive shaft 116 so that the drive shaft 116 can also actuate the fan impeller 190. Here, the fan impeller 190 and the drive shaft 116 are non-positively connected to each other. The fan impeller 190 comprises a connecting body 192 and an air control body 194. The connecting body 192 connects the air control body 194 to the drive shaft 116, wherein here the connecting body 192 is encapsulated by the air control body 194. Hereby, the connecting body 192 forms a non-positive connection with the drive shaft 116 by means of a press-fit. The connecting body 192 rests against the bearing 180. Here, the connecting body 192 is in contact with an inner ring 182 of the bearing 180. In addition, the bearing 180, in particular the inner ring 182, is in contact with the drive motor 114, in particular with a spacer 164 of the drive motor 114. The air control body member 194 directs air within the housing 110, thereby creating an air flow within the housing 110 from the air inlet opening 115 to the air outlet opening 117. Here, the air control body 194 comprises air control fins 196, wherein the air control body 194, in particular the air control fins 196, are directed towards the sensor board 240 and the drive motor 114. The sensor board 240 is arranged between the drive motor 114 and the fan impeller 190 such that the air flow from the drive motor 114 to the fan impeller 190 can be directed around the sensor board 240 with substantially low turbulence. The arrangement of the sensor board 240 allows the air flow to enter the housing 110 through the air inlet opening 115 and to flow with substantially low turbulence over the percussion mechanism housing 123, the transmission housing 119 and the percussion mechanism cover 127.

Here, the percussion mechanism cover 127 and the transmission housing 119 are in one piece.

The housing 110 comprises at least one flow-through element 260, see also FIG. 3. The flow-through element 260 is arranged between the drive motor 114 and the fan impeller 190. Here, the housing 110 forms the flow-through element 260 and the housing 110 and the flow-through element 260 are in one piece. As an example, two flow-through elements 260 are formed here, wherein the flow-through elements are formed as flow-through openings 262. The flow-through openings 262 are exemplarily formed as circular segments.

The sensor board 240 comprises at least one air control element 246, see also FIGS. 3 and 4. The air control element 246 is intended to direct the air flow from the drive motor 114 to the fan impeller 190. Here, the sensor board 240 forms the air control element 246, wherein the air control element 246 is exemplarily formed as an opening 248 or an exception 250, see also FIGS. 3 and 4.

FIG. 3 shows a cross-sectional view 500 of the hand-held power tool 100 for various embodiments of the sensor board 240. The sensor board 240 comprises at least one sensor element 252. The sensor element 252 is here exemplarily formed as a Hall sensor. Here, three sensor elements 252 are formed on the sensor board 240; see also FIG. 4. The sensor board 240 encompasses the drive shaft 116 at least in sections.

The mounting element 200 comprises at least one mounting receptacle 202. The mounting receptacle 202 is shaped to accommodate the bearing 180. The mounting element 200 forms the mounting receptacle 202 so that the mounting element 200 and the mounting receptacle 202 are in one piece. The mounting receptacle 202 is shaped, for example, like a half-shell. Here, two mounting elements 200 are formed for the two half shells 112 of the housing 110, so that each mounting element 200 comprises a respective mounting receptacle 202. The mounting receptacle 202 encompasses, in particular encloses, the bearing 180 at least partially, in particular in a peripheral direction with respect to the hand-held power tool axis 102. Furthermore, the mounting element 202 comprises at least one sensor board receptacle 204. The sensor board receptacle 204 is shaped to accommodate the sensor board 240 and secures the sensor board 240 axially and/or radially. The sensor board receptacle 204 accommodates the sensor board 240 with at least an interlocking fit. The mounting element 200 comprises at least one air control element 206. The air control element 206 is intended to guide the air flow from the drive motor 114 to the fan impeller 190. The mounting element 200 forms the air control element 206. Here, the air control element 206 is exemplarily shaped as an opening. The sensor cable 242 is not shown in detail here.

Figure 3A:
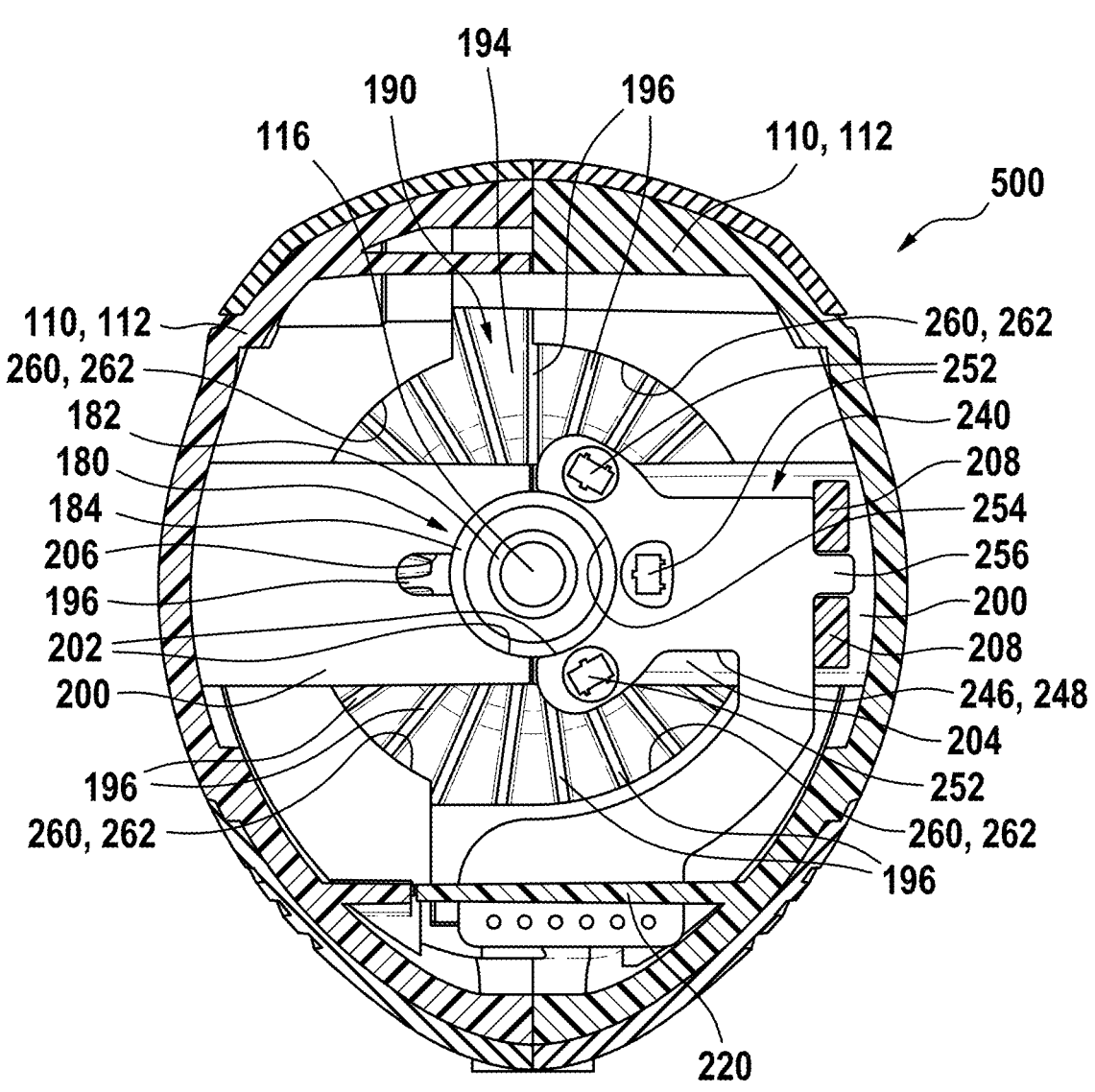
FIG. 3a a cross-sectional view of the hand-held power tool with a first embodiment of a sensor board.

In FIG. 3*a*, a cross-sectional view 500 of the hand-held power tool 100 is shown with a first embodiment of a sensor board 240. Here, the sensor board 240 is shaped in an exemplary J-shape. The sensor board 240 encompasses the drive shaft 116 in an angular range of 180°. In this case, the sensor board receptacle 204 accommodates the sensor board 240 with an interlocking fit. The sensor board receptacle 204 is shaped here in the manner of a shell. The air control element 246 is shaped here as the air control opening 248, wherein the air control opening 248 is shaped substantially in the form of a circular ring cut-out. The sensor board 240 here encompasses the bearing 180 in an angular range from 100° to 190°, see also FIGS. 3*b, c* and *d*.

Figure 3B:
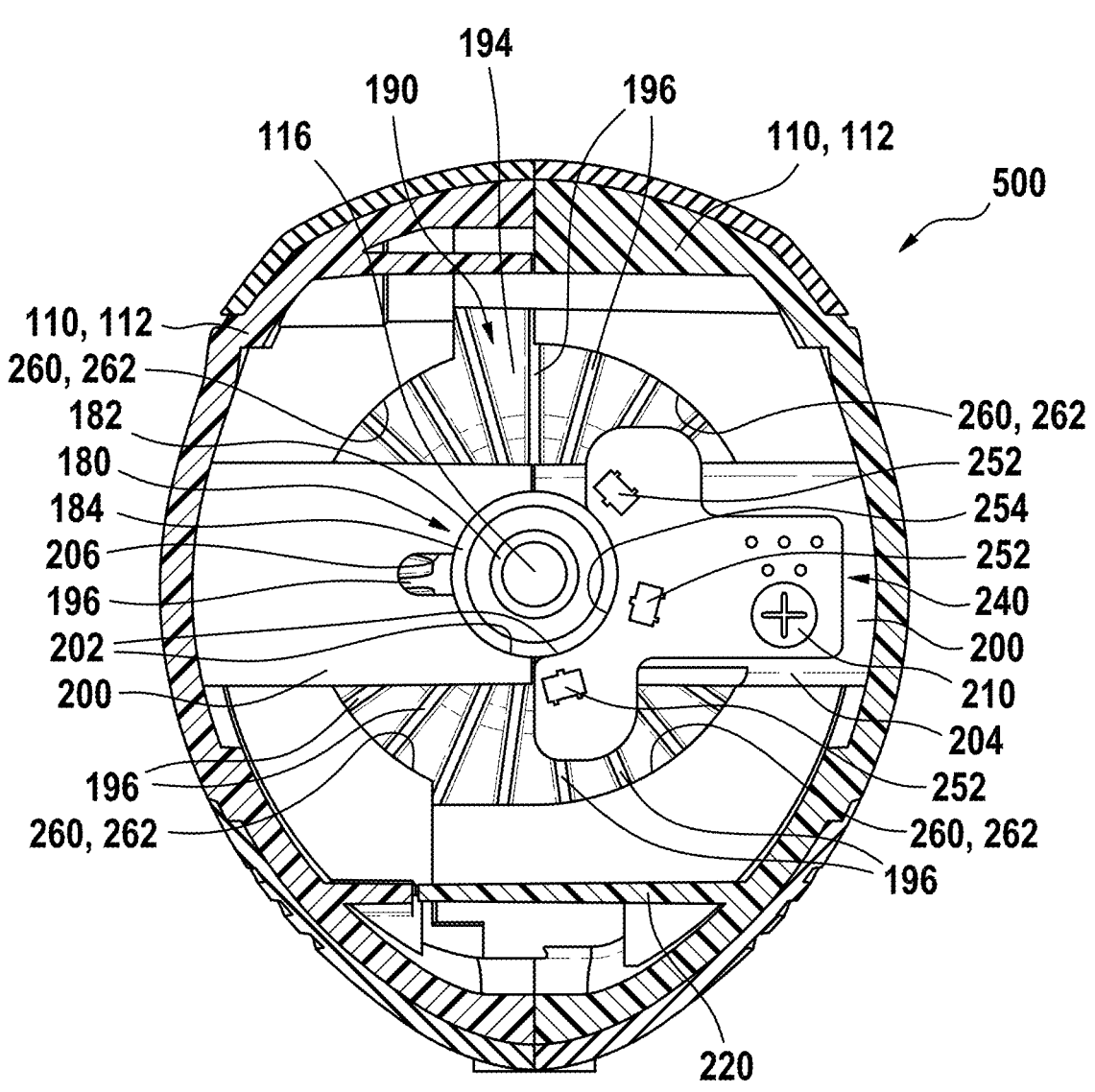
FIG. 3b a cross-sectional view of the hand-held power tool with a second embodiment of the sensor board.

The sensor board 240 comprises a receptacle element 254, see also FIGS. 3*b* and *c*. The receptacle element 254 is intended to accommodate the bearing 180. The receptacle element 254 here forms an interlocking connection with the bearing 180 and is shaped here, by way of example, in the manner of an opening in the shape of a arcuate cut-out, see also FIGS. 3b and c. The receptacle element 254 is shaped such that the sensor board 240 bears against the bearing 180, in particular the outer ring 184, by means of the receptacle element 254, see also FIGS. 3b and c.

Figure 3C:
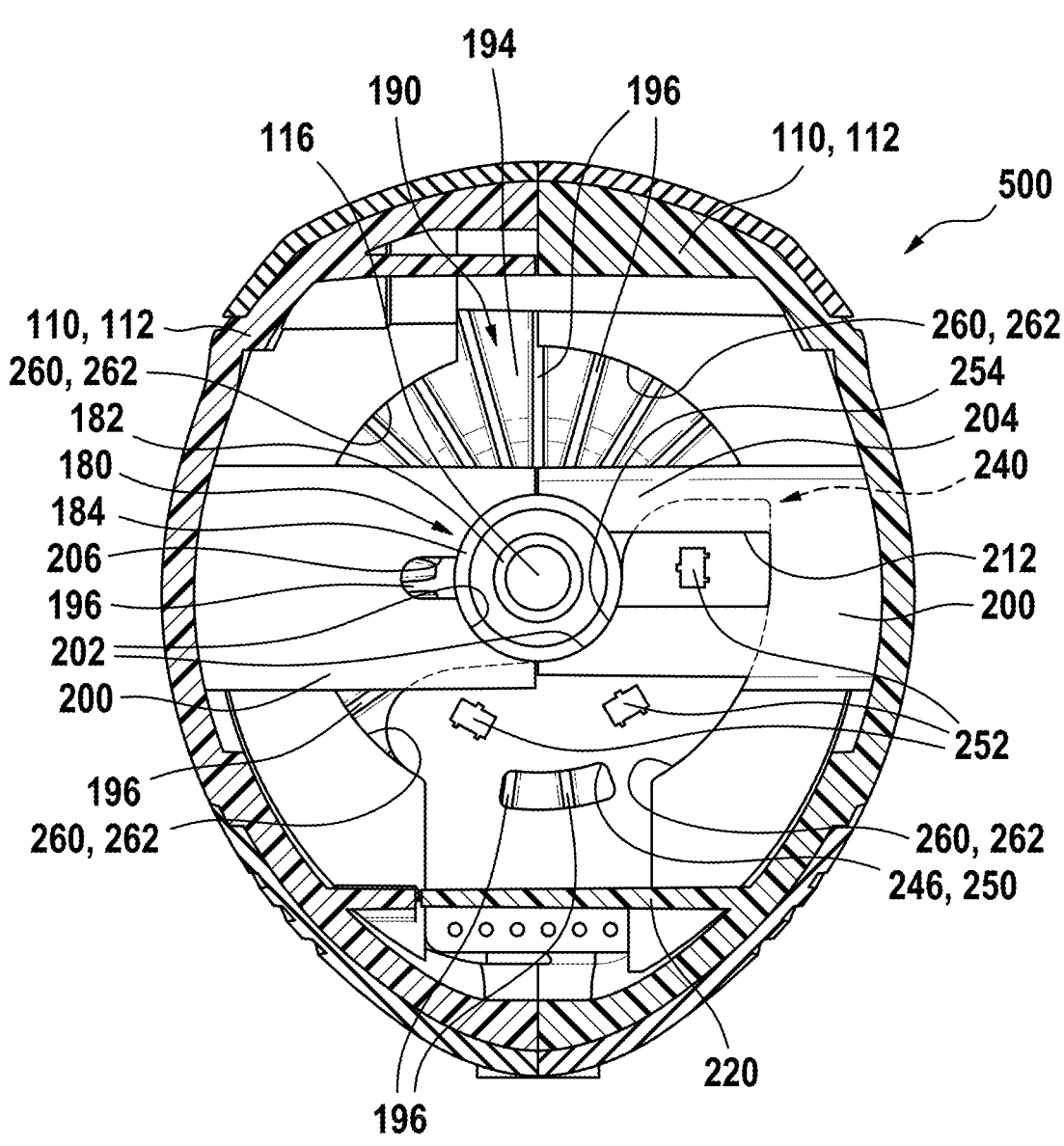
FIG. 3c a cross-sectional view of the hand-held power tool with a third embodiment of the sensor board.
Figure 3D:
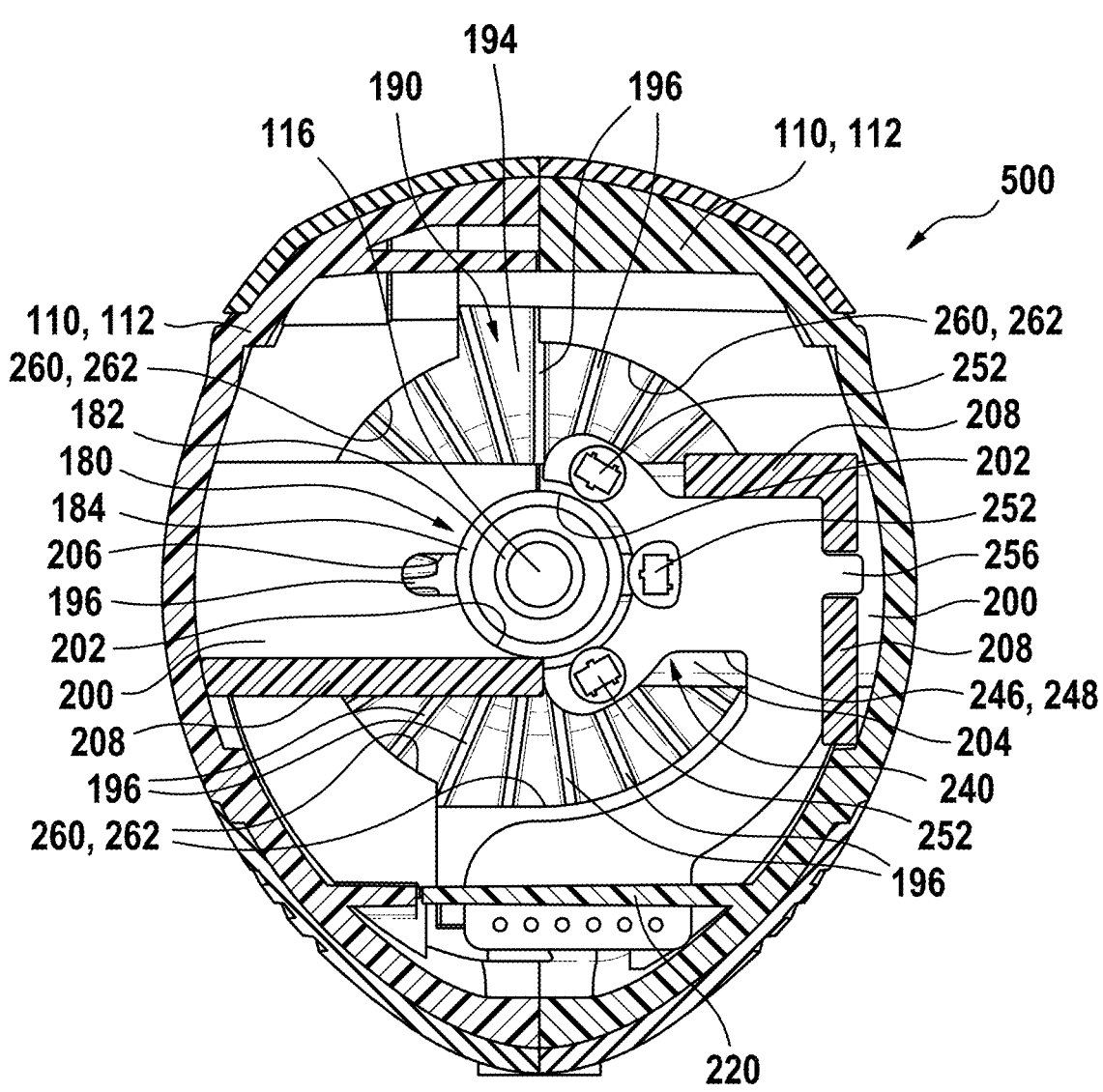
FIG. 3d a cross-sectional view of the hand-held power tool with a fourth embodiment of the sensor board.

The mounting element 200 comprises at least one support element 208, see also FIG. 3d. The support element 208 is provided to support the sensor board 240 with respect to the housing 110. Here, the mounting element 200 forms the support element 208 so that the mounting element 200 and the support element 208 are in one piece. The support element 208 is formed here, for example, as two webs. In addition, the sensor board 240 here comprises a pin; see also FIG. 3d. The support element 208 here accommodates the pin 256 with an interlocking fit. The further mounting element 220 is shaped here as a web and here at least partially encompasses the sensor board 240. Here, the mounting element 200 forms the mounting receptacle 202, the sensor board receptacle 204 and the support element 208.

In FIG. 3b, the cross-sectional view 500 of the hand-held power tool 100 is shown with a second embodiment of the sensor board 240. Only the differences to FIG. 3a are described here and below. The sensor board 240 is essentially T-shaped. The sensor board 240 is here screwed to the sensor board receptacle 204 by means of a screw 210. The sensor board receptacle 204 is shaped in the manner of a shaft.

In FIG. 3c, the cross-sectional view 500 of the hand-held power tool 100 is shown with a third embodiment of the sensor board 240. For example, the sensor board 240 is shaped in the manner of a crescent with a web. The sensor board receptacle 204 is shaped in the manner of a pocket with a sensor recess 212. The further mounting element 220 is shaped in the manner of a web and at least partially encloses the web of the sensor board 240. The air control element 246 is shaped as the air control opening 250, wherein the air control opening 250 is substantially elliptical in shape.

In FIG. 3d, the cross-sectional view 500 of the hand-held power tool 100 is shown with a fourth embodiment of the sensor board 240. For example, the sensor board 240 is J-shaped. In addition, the sensor board 240 is spaced apart from the bearing 180 so that the sensor board 240 and the bearing 180 are spaced apart from each other. Three support elements 208 are formed here, wherein two support elements 208 are formed in the manner of a web and one support element 208 is formed in the manner of an L-shaped angle. The sensor board receptacle 204 is shaped in the manner of a shell, for example. Here, the mounting element 200, the sensor board receptacle 204 and the support elements 208 are in one piece.

Figure 3E:
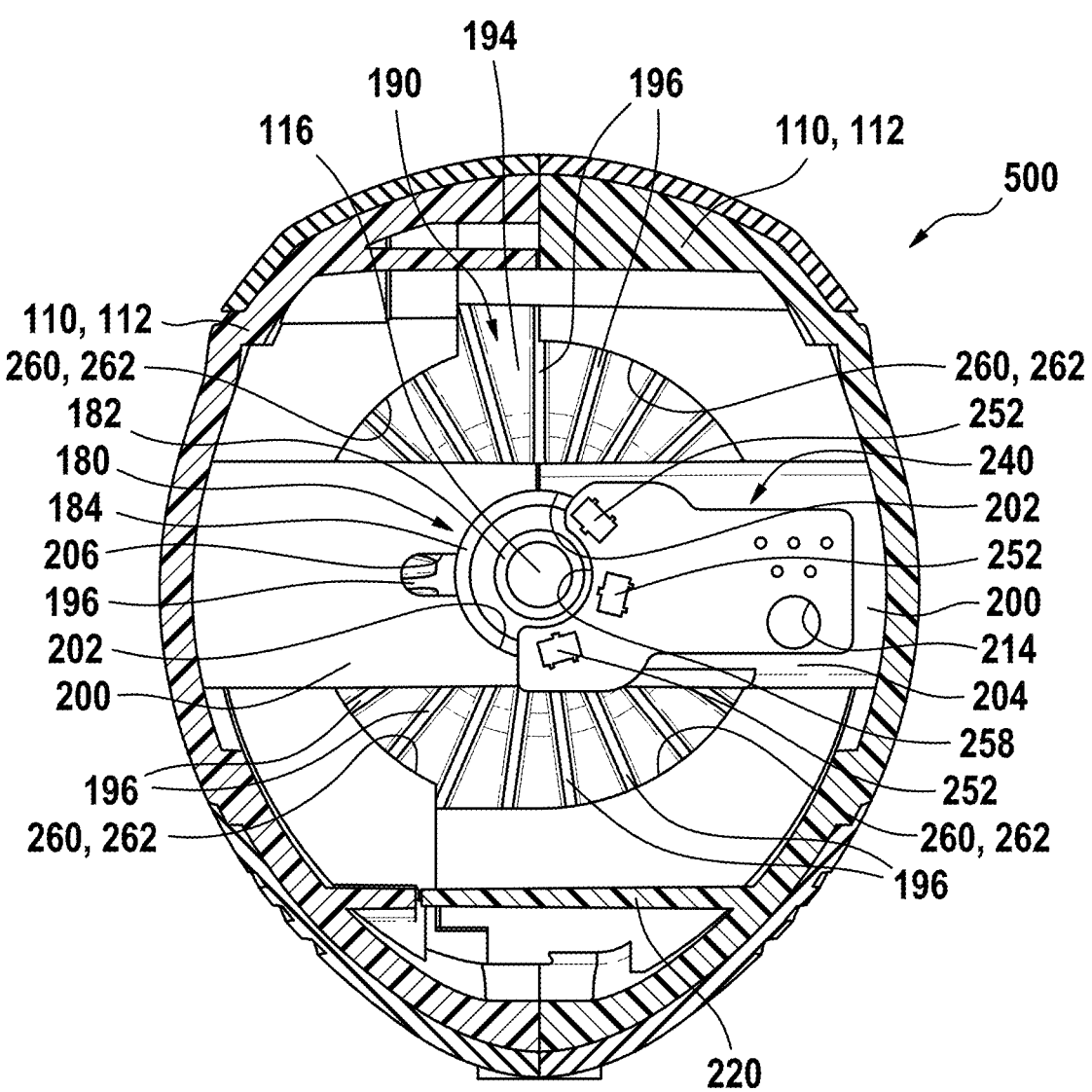
FIG. 3e a cross-sectional view of the hand-held power tool with a fifth embodiment of the sensor board.

In FIG. 3e, the cross-sectional view 500 of the hand-held power tool 100 is shown with a fifth embodiment of the sensor board 240. The sensor board 240 is essentially rectangular, in particular cuboid, in shape. The mounting element 200 is designed here such that the sensor board 240 is arranged axially offset relative to the bearing 180. Thus, the sensor board 240 is arranged between the bearing 180 and the drive motor 114. An outer diameter of the bearing 180 is here larger than an opening 258 of the sensor board 240 for the drive shaft 116. The sensor board receptacle 204 is shaped in the manner of a pot. Here, the sensor board 240 comprises a strain relief hole 214 for the sensor cable 242, which is not shown in detail.

Figure 4A:
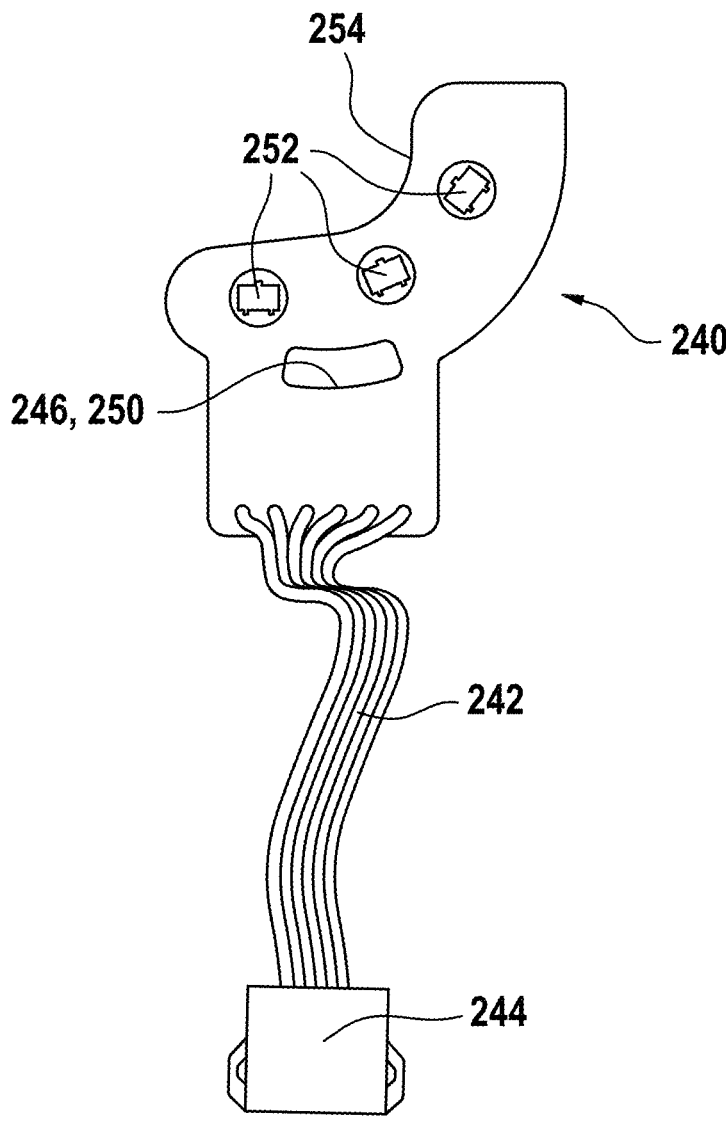
FIG. 4a a perspective front view of the sensor board in the third embodiment.
Figure 4B:
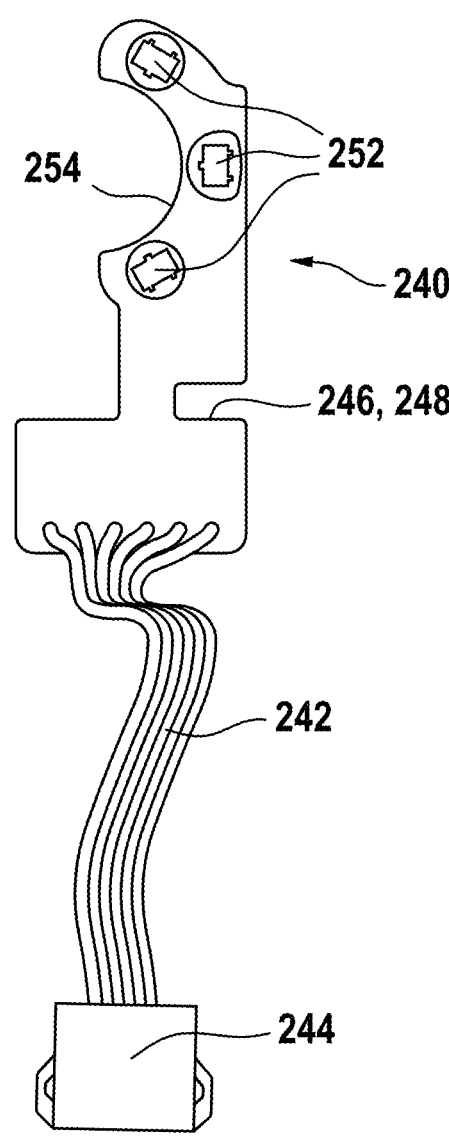
FIG. 4b a perspective front view of the sensor board in a sixth embodiment.

In FIG. 4a, a perspective front view of the sensor board 240 in the third embodiment is shown. In FIG. 4b, a perspective front view of the sensor board 240 in a sixth embodiment is shown. Here, the sensor board 240 is shaped in the manner of a crescent with a handle. In addition, the air control element 246 is formed as the air control opening 248 In this case, the air control opening 248 is rectangular in shape.

Figure 4C:
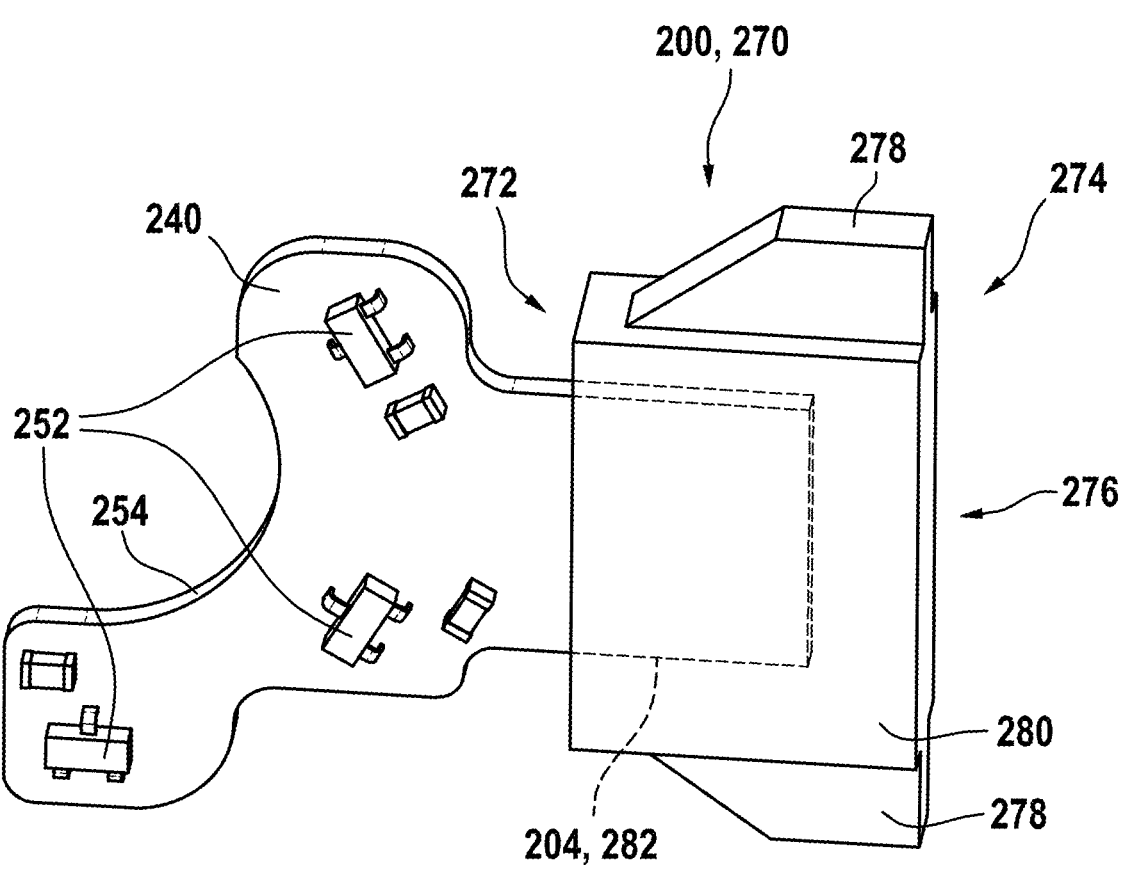
FIG. 4c a perspective view of the sensor board in a seventh embodiment with a connecting coupling.

FIG. 4c shows a perspective view of the sensor board 240 in a seventh embodiment with a connecting coupling 270. The mounting element 200 is formed here as the connecting coupling 270. The connecting coupling 270 comprises the sensor board receptacle 204 and a plug-in element 276. In this case, the sensor board receptacle 204 is arranged at a first free end 274 of the connecting coupling 270. The sensor board receptacle 204 is shaped here as a shaft-like receptacle 282 for the sensor board 240. The shaft-like receptacle 282 accommodates the sensor board 240 at least partially and at least in sections, and at least partially encloses the sensor board 240. Here, the sensor board 240 is insertable into the shaft-like receptacle 282. The plug-in element 276 is arranged at a second free end 274 of the connecting coupling 270. Here, the plug-in element has two plug-in lugs 278 and a plug-in frame 280. The plug-in element 276 is intended to form a mechanical connection with at least the housing 110. For this purpose, the housing 110 comprises a socket, not shown, for the plug-in element 276. The plug-in element 276 and the socket are shaped such that the plug-in element 276 can be inserted into the socket.

The invention claimed is:

1. A hand-held power tool comprising:
a housing;
a tool holder configured to hold an insert tool;
an electrically commutated drive motor arranged in the housing, the drive motor having a drive shaft mounted by at least one bearing;
a fan impeller;
a sensor board configured for sensor-controlled commutation of the electrically commutated drive motor, the sensor board arranged in the housing between the drive motor and the fan impeller; and
at least one mounting element configured to support the sensor board in the housing in a manner mechanically decoupled from the electrically commutated drive motor,
wherein the sensor board and the fan impeller are arranged at an end of the electrically commutated drive motor facing away from the tool holder, and
the sensor board has at least one receptacle element configured to engage the at least one bearing and to support the sensor board on the at least one bearing by the at least one receptacle element.

2. The hand-held power tool according to claim 1, wherein the at least one mounting element is designed such that the sensor board is arranged between the drive motor and the fan impeller.

3. The hand-held power tool according to claim 1, wherein the at least one bearing is arranged between the drive motor and the fan impeller.

4. The hand-held power tool according to claim 1, wherein the sensor board is designed such that the sensor board at least partially encompasses around the drive shaft.

5. The hand-held power tool according to claim 1, wherein the at least one mounting element has at least one mounting receptacle designed to accommodate the at least one bearing.

6. The hand-held power tool according to claim 5, wherein the at least one mounting receptacle at least partially encompasses the at least one bearing.

7. The hand-held power tool according to claim 6, wherein the at least one mounting receptacle encloses the at least one bearing in a peripheral direction.

8. The hand-held power tool according to claim 1, wherein the at least one mounting element has at least one sensor board receptacle designed to accommodate the sensor board.

9. The hand-held power tool according to claim 1, wherein the at least one mounting element has at least one support element configured to support the sensor board towards the housing.

10. The hand-held power tool according to claim 1, further comprising:

a further mounting element configured to mount the sensor board, the further mounting element extending from the housing between the drive motor and the fan impeller.

11. The hand-held power tool according to claim 10, wherein at least one of the at least one mounting element and the further mounting element has at least one air control element designed to guide an air flow from the drive motor to the fan impeller.

12. The hand-held power tool according to claim 1, wherein the housing has at least one flow-through element arranged between the drive motor and the fan impeller.

13. The hand-held power tool according to claim 1, wherein the sensor board has at least one air control element configured to guide an air flow from the drive motor to the fan impeller.

14. The hand-held power tool according to claim 1, wherein the at least one mounting element has at least one air control element designed to guide an air flow from the drive motor to the fan impeller.

15. A hand-held power tool comprising:

a housing;

a tool holder configured to hold an insert tool;

an electrically commutated drive motor arranged in the housing, the drive motor having a drive shaft mounted by at least one bearing;

a fan impeller;

a sensor board configured for sensor-controlled commutation of the electrically commutated drive motor, the sensor board arranged in the housing between the drive motor and the fan impeller;

a first mounting element configured to support the sensor board in the housing in a manner mechanically decoupled from the electrically commutated drive motor; and a further mounting element configured to support the sensor board, the further mounting element extending from the housing between the drive motor and the fan impeller, wherein the sensor board and the fan impeller are arranged at an end of the electrically commutated drive motor facing away from the tool holder, and wherein the first mounting element and the further mounting element extend inwardly from the housing.

* * * * *